(12) United States Patent
Finnie et al.

(10) Patent No.: US 12,736,933 B2
(45) Date of Patent: Sep. 15, 2026

(54) DEVICE AND METHOD FOR DETERMINING ADVERSARIAL PERTURBATIONS OF A MACHINE LEARNING SYSTEM

(71) Applicant: Robert Bosch GmbH, Stuttgart (DE)

(72) Inventors: Nicole Ying Finnie, Renningen (DE); Jan Hendrik Metzen, Boeblingen (DE); Robin Hutmacher, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 639 days.

(21) Appl. No.: 18/331,044

(22) Filed: Jun. 7, 2023

(65) Prior Publication Data

US 2023/0418246 A1 Dec. 28, 2023

(30) Foreign Application Priority Data

Jun. 22, 2022 (EP) .................................... 22180551

(51) Int. Cl.
*G05B 13/04* (2006.01)
*G05B 13/02* (2006.01)

(52) U.S. Cl.
CPC ....... *G05B 13/045* (2013.01); *G05B 13/0265* (2013.01)

(58) Field of Classification Search
CPC ... G05B 13/0265; G05B 13/045; G06N 20/00
See application file for complete search history.

(56) References Cited

U.S. PATENT DOCUMENTS 10,521,718 B1 * 12/2019 Szegedy ................ G06N 3/088
11,893,111 B2 * 2/2024 Kruthiveti Subrahmanyeswara Sai .............. G06N 3/04

(Continued)

FOREIGN PATENT DOCUMENTS

| | | | |
|---|---|---|---|
| CN | 113033822 | * | 6/2021 |
| CN | 113033822 | A | 6/2021 |
| CN | 113326356 | A | 8/2021 |

OTHER PUBLICATIONS

Seyed-Mohsen Moosavi-Dezfooli; Alhussein Fawzi; Universal Adversarial Perturbations, 2017, IEEE Conference on Computer Vision and Pattern Recognition, vol. 2. 2017, pp. 1-9, 2017.*

(Continued)

*Primary Examiner* — Mohammad A Siddiqi
(74) *Attorney, Agent, or Firm* — NORTON ROSE FULBRIGHT US LLP

(57) ABSTRACT

A computer-implemented method for determining an adversarial perturbation for input signals, especially sensor signals or features of sensor signals, of a machine learning system. A best perturbation is determined iteratively, wherein the best perturbation is provided as adversarial perturbation after a predefined amount of iterations, wherein at least one iteration includes: sampling a perturbation; applying the sampled perturbation to an input signal thereby determining a potential adversarial example; determining an output signal from the machine learning system for the potential adversarial example, determining a loss value characterizing a deviation of the output signal to a desired output signal, wherein the desired output signal corresponds to the input signal, if the loss value is larger than a previous loss value setting the best perturbation to the sampled perturbation.

10 Claims, 10 Drawing Sheets

(56) References Cited

U.S. PATENT DOCUMENTS

| | | | | |
|---|---|---|---|---|
| 12,069,047 | B2 * | 8/2024 | Wu | G06N 3/08 |
| 12,481,874 | B2 * | 11/2025 | Liu | G06N 3/0495 |
| 12,505,513 | B2 * | 12/2025 | Kapoor | G06N 3/08 |
| 2019/0130110 | A1 * | 5/2019 | Lee | G06F 21/57 |
| 2019/0295721 | A1 * | 9/2019 | Madabhushi | G16H 30/40 |
| 2019/0370683 | A1 * | 12/2019 | Metzen | G06N 20/00 |
| 2020/0257978 | A1 * | 8/2020 | Roy | G06N 3/09 |
| 2020/0285952 | A1 * | 9/2020 | Liu | G06N 3/09 |
| 2021/0089957 | A1 * | 3/2021 | Ermans | G06N 3/0464 |
| 2022/0207304 | A1 * | 6/2022 | Hashimoto | G06V 10/82 |
| 2024/0005209 | A1 * | 1/2024 | Schmidt | G06N 3/094 |
| 2025/0307703 | A1 * | 10/2025 | Kakizaki | G06N 20/00 |

OTHER PUBLICATIONS

He et al. ("Adversarial Personalized Ranking for Recommendation", Published: Jun. 27, 2018, p. 355-364) (Year: 2018).*

Ballet et al., "Imperceptible Adversarial Attacks on Tabular Data," Neurips 2019 Workshop on Robust AI in Financial Services: Data, Fairness, Explainability, Trustworthiness and Privacy (Robust AI in FS 2019), 2019, pp. 1-9. <https://arxiv.org/pdf/1911.03274.pdf> Downloaded Jun. 6, 2023.

Brendel et al., "Decision-Based Adversarial Attacks: Reliable Attacks Against Black-Box Machine Learning Models," Sixth International Conference on Learning Representations (ICLR 2018), 2018, pp. 1-12. <https://arxiv.org/pdf/1712.04248.pdf> Downloaded Jun. 6, 2023.

* cited by examiner

DEVICE AND METHOD FOR DETERMINING ADVERSARIAL PERTURBATIONS OF A MACHINE LEARNING SYSTEM

CROSS REFERENCE

The present application claims the benefit under 35 U.S.C. § 119 of European Patent Application No. EP 22 18 0551.8 filed on Jun. 22, 2022, which is expressly incorporated herein by reference in its entirety.

FIELD

The present invention concerns a method for determining an adversarial perturbation of a machine learning system, a method for training the machine learning system, a training system, a computer program, and a machine-readable storage device.

BACKGROUND INFORMATION

Ballet et al. "Imperceptible Adversarial Attacks on Tabular Data", 2019, https://arxiv.org/pdf/1911.03274.pdf describes the notion of adversarial examples in the tabular domain. The authors propose a formalization based on the imperceptibility of attacks in the tabular domain leading to an approach to generate imperceptible adversarial examples. Experiments show that imperceptible adversarial examples can be generated with a high fooling rate.

Brendel et al. "Decision-Based Adversarial Attacks: Reliable Attacks Against Black-Box Machine Learning Models", 2018, https://arxiv.org/abs/1712.04248 describes the Boundary Attack, a decision-based attack that starts from a large adversarial perturbation and then seeks to reduce the perturbation while staying adversarial.

Machine learning system serve as backbone for solving a variety of technical tasks and problems, e.g., in image classification, audio and sound detection and classification or as virtual sensor for determining indirect measurements from suitable sensor signals. However, it is known that machine learning systems are susceptible to adversarial examples, i.e., data samples used as input to the machine learning system to maliciously provoke a wrong prediction by the machine learning system.

Conventional methods have focused on designing adversarial examples for images, wherein the goal is to have the adversarial example be imperceptible to a human. The rationale behind this is typically phrased as the human being unable to recognize an attack on the machine learning system by simply looking at the input.

Especially for non-image data used as input of a machine learning system, however, imperceptibility is typically not of the highest concern. While for images, a human may directly "see" that the image has been altered, this is typically not the case for non-image data such as tabular data expressed in terms of feature vectors. As non-image data does not exhibit image characteristics such as local consistency (i.e., two consecutive feature vector dimensions may not be related at all, while neighboring pixels of an image are highly correlated), it may be impossible to notice adversarial examples for such data even if the perturbation used for the adversarial example is relatively high (Ballet et al., Sec. 3: "[W]hile most people can usually tell the correct class of an image and whether it appears altered or not, it is much complex for tabular data: this type of data is less readable and expert knowledge is required.")

Another aspect of non-image data is that the data may typically comprise integer values, e.g., a feature vector used as input of a machine learning system may comprise integer values and float values. Adversarial examples or adversarial perturbations are typically obtained by running gradient-based methods, which require that input signals may be changed on a floating-point level. However, the adversarial examples obtained this way cannot be used in real-world examples requiring integer inputs for at least some parts of the input signal.

Advantageously, a method with features of present invention allows for determining adversarial perturbations without the need for gradients. This allows for adversarial perturbations to be obtained for input signals comprising integer values (although the method itself is also applicable in case of input signals comprising only floating-point values).

SUMMARY

In a first aspect, the present invention concerns a computer-implemented method for determining an adversarial perturbation for input signals, especially sensor signals, of a machine learning system. According to an example embodiment of the present invention, a best perturbation is determined iteratively, wherein the best perturbation is provided as adversarial perturbation after a predefined amount of iterations, wherein at least one iteration comprises the steps of:

- Sampling a perturbation;
- Applying the sampled perturbation to an input signal thereby determining a potential adversarial example;
- Determining an output signal from the machine learning system for the potential adversarial example;
- Determining a loss value characterizing a deviation of the output signal to a desired output signal, wherein the desired output signal corresponds to the input signal;
- If the loss value is larger than a previous loss value setting the best perturbation to the sampled perturbation.

An adversarial perturbation may be understood as an entity that can be applied to an input signal of the machine learning system, wherein by applying the adversarial perturbation an adversarial example is determined. The adversarial perturbations may be organized in a same structure as is the input signal. For example, the input signal may be a vector and the adversarial perturbation may be a vector as well. The term "application an adversarial perturbation" may be understood as overlaying an input signal with the adversarial perturbation. The overlay may, for example, be executed by replacing values of the input signal by values of the adversarial perturbation or, preferably, by adding the adversarial perturbation to the input signal.

The input signal may preferably be a sensor signal, i.e., a signal obtained from a sensor. Preferably, the sensor signal is not an image or image-like sensor signal but expressed as a feature vector. The sensor signal may especially characterize a time series of measurements measured by the sensor.

In preferred embodiments of the present invention, the input signal comprises at least one integer value, possibly being restricted to a certain range. For example, the integer value may be a temperature expressed as an integer and limited to a certain range. Alternatively, the input signal may characterize a received radar signal and the integer may characterize a pulse length of the radar signal in milliseconds. In this case, the dimension of the input signal characterizing the pulse length is bound from below at 0 and bound from above by the time since emitting the radar signal.

The machine learning system is configured to determine an output signal based on the input signal. Preferably, the output signal characterizes a classification and/or regression result and/or a density value and/or a probability value based on the input signal.

That is, the machine learning system may be used for classifying input signals and/or to determine a result of a regression analysis based on the input signal. Alternatively or additionally, the machine learning system may be configured to determine a density value, a likelihood value or a probability value based on the input signal. Such a value may be understood as a likelihood of the input signal to appear given the data the machine learning system has been trained with. For example, the machine learning system may be a (variational) autoencoder, a generative adversarial network, a normalizing flow or a diffusion model.

According to an example embodiment of the present invention, the method for determining the adversarial perturbation is run for a predefined amount of iterations. The amount of iterations may also be defined implicitly, e.g., by providing a maximum runtime of the method, determining a runtime for each iteration and then deducing the an amount of iterations from the maximum runtime.

In each iteration, a perturbation may be determined. The perturbation can be understood as a plurality of values of the same shape as the input signal (e.g., a vector). Both perturbation and input signal being of the same shape, there may preferably exist corresponding dimensions of the perturbation and the input signal. That is, a dimension at index i of the perturbation corresponds with a dimension of the input signal at index i. Preferably, corresponding dimensions of the perturbation and the input signal are of the same data type. That is, if a dimension of the input signal carries integer values, the corresponding dimension of the perturbation does carry integer values as well. The perturbation may preferably be sampled such that the allowed range of each dimension of the input signal is maintained after applying the perturbation. If applying the perturbation is achieved by adding the perturbation to the input signal, the perturbation may, for example, be clipped such that after addition the allowed range for each dimension is maintained. That is, the values of each dimension of the potential adversarial example are in the allowed range.

For determining the perturbation, a value of the perturbation for dimensions characterizing integer data may hence be determined by sampling from a discrete probability distribution. Alternatively, it is also possible to sample from a continuous probability distribution and quantize the sampled value before providing it in the perturbation.

The fitness of the perturbation with respect to fooling the machine learning system can be assessed by a loss function. The loss function may preferably determine a deviation of a desired output signal corresponding to the (original) input signal to the output signal determined for the potential adversarial example. That is, the desired output signal may be provided together with the input signal and the loss function may then determine a loss value characterizing the deviation. As loss function, any loss function suitable for the type of output signal may be chosen. For example, if the output signal characterizes a classification, the loss function may be a cross entropy loss. If the output signal characterizes a result of a regression analysis, the loss function may be a mean squared error loss or an L1-loss. If the output signal comprises different output types (e.g., classification and regression result), each type may be assessed by a loss function and the resulting loss values may be summed or averaged to determine the loss value of the current iteration.

According to an example embodiment of the present invention, in each iteration, the determined loss value is compared to the previous loss value. The previous loss value can be understood as a loss value determined in a previous iteration or as an initial value if the current iteration is a first iteration. This approach may be understood as saving the largest loss value and the perturbation corresponding to the largest loss value. This way, the ability of the perturbation to fool the machine learning system increases over the course of the iterations. This may be understood as an optimization of the perturbation without requiring gradients or knowledge of the architecture of the machine learning system, i.e., a black box attack on the machine learning system.

Advantageously, the attack choses the perturbation corresponding to the largest loss value as adversarial perturbation, i.e., the perturbation found best suited for fooling the machine learning system. By obtaining this perturbation, a user or developer of the machine learning system gains a direct insight into the machine learning system, i.e., an insight into the weakness of the machine learning system. The adversarial perturbation is a technical condition which is related to the internal functioning of the machine learning system as the adversarial perturbation may be overlayed with arbitrary input signals to form adversarial examples. By automatically detecting the adversarial perturbation by means of the method, a user of the machine learning system hence advantageously gains insight into the machine learning system and its weaknesses. The user is able to detect the weaknesses and is able to initiate counter measures such as detectors for the specific adversarial perturbation or performing adversarial training on the machine learning system to defend it against the adversarial perturbation.

In preferred embodiments of the present invention, elements of the sampled perturbation are set to zero in each iteration, wherein the number of elements set to zero is proportional to how many iterations have passed.

Advantageously, this approach gradually limits the amount of dimensions in the input signal the adversarial perturbation may alter. This approach can hence be used to determine a small amount of the most vulnerable dimensions of the input signal. This gives the user even further insight into the machine learning system, in particular which group of features are the most vulnerable features.

According to an example embodiment of the present invention, preferably, at least one element of the input signal characterizes an integer and the sampled perturbation comprises a corresponding element characterizing an integer.

Advantageously, the method allows for determining adversarial perturbations that have integer dimensions. While known methods rely on gradient descent to determine adversarial perturbations, such known methods require that dimensions of the adversarial perturbations are expressed as floats as gradient descent requires a smooth loss function in the input variables. Hence, known methods are incapable of dealing with integers and require proxy methods such as quantization to determine adversarial perturbations. In contrast, the proposed embodiments of the method allow for sampling integer values directly, preferably from a probability distribution with support in the integers, possibly even with a fixed range in the integers.

According to an example embodiment of the present invention, in the method it is also possible that the adversarial perturbation is sampled by sampling a random perturbation for each input signal of a dataset and combining the sampled random perturbations.

In another aspect, the present invention concerns a method for training the machine learning system according, wherein training comprises determining for a training input signal of the machine learning system an adversarial perturbation according to an embodiment of the previously described method for determining an adversarial perturbation, applying the adversarial perturbation to the training input signal thereby determining an adversarial example and training the machine learning system to predict a desired output signal corresponding to the training input signal for the adversarial example.

The training method may be understood as a form of adversarial training for hardening the machine learning system against the strongest adversarial perturbation found with the previous method. Preferably, the method may be repeated iteratively to determine a plurality of adversarial perturbations to defend against. Advantageously, the method for training hardens the machine learning system against adversarial examples.

Embodiments of the present invention will be discussed with reference to the following figures in more detail.

DETAILED DESCRIPTION OF EXAMPLE EMBODIMENTS

Figure 1:
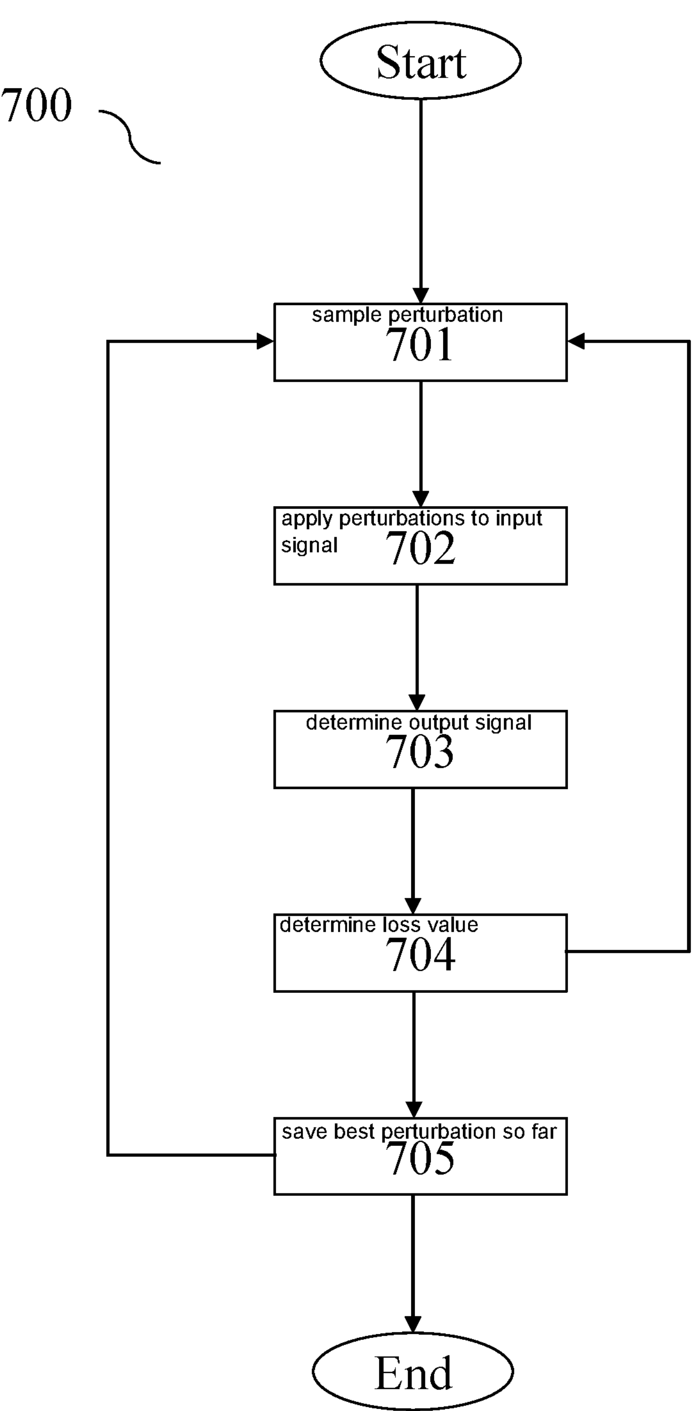
FIG. 1 shows schematically a method for determining an adversarial perturbation, according to an example embodiment of the present invention.

FIG. 1 shows a flow chart depicting a method for determining an adversarial perturbation for a machine learning system. The machine learning system may preferably be configured to receive an input signal in the form of a vector. The vector may preferably comprise integer values. The input signal may, for example, be a sensor signal or characterize features of a sensor signal, e.g., a pulse length of a received radar signal. The machine learning system is configured to determine an output signal from the input signal. The output signal may preferably characterize a classification and/or a regression result with respect to the input signal. The output signal may, for example, classify distances to or speeds from objects reflecting the radar signal.

Prior to the method, the machine learning system has preferably been trained.

The method proceeds iteratively. In a first step (701) of the method, a perturbation is sampled. In case the input signal characterizes a multidimensional structure of a same datatype such as a vector, a matrix or a tensor, the perturbation may be sampled from a multivariate distribution. Alternatively, each dimension of the input signal may correspond to a univariate or multivariate probability distribution for sampling the values.

In a second step (702), the samples perturbation is applied to the input signal. The application may preferably be achieved by using the sampled perturbation as additive noise. Thereby, a potential adversarial example is determined. It is potential because its fitness for actually fooling the machine learning system has not been assessed yet.

In a third step (703) an output signal from the machine learning system for the potential adversarial example is determined. This is achieved by feeding the potential adversarial example to the machine learning system as an input and determining the output from the machine learning system. For example, if the machine learning system is a neural network or comprises a neural network, the output signal is determined by forwarding the potentially adversarial example through the neural network.

In a fourth step (704) a loss value characterizing a deviation of the output signal to a desired output signal is determined. The desired output signal corresponds to the input signal. In other words, the desired output signal may be considered an annotation of the input signal with the goal of the adversarial perturbation to bring the output signal as far away from the desired output signal as possible. The loss value may preferably be determined based on a loss function, wherein an input to the loss function comprises the output signal and desired output signal for determining. Preferably, a same loss function is used as was used for training the machine learning system.

If the loss value is larger than a previously determined loss value, preferably if a sum of loss values for a plurality of input signals is larger than a previously determined sum of a plurality of loss values, the adversarial perturbation is saved as best perturbation, i.e., the best perturbation found so far in a fifth step (705).

After the fifth step (705), a new iteration of the method may be conducted by starting back at step one (701). For sampling, the best perturbation found in each step may be used as an expected value of the distribution from which a perturbation is sampled (or for the plurality of distributions).

If a desired amount of iterations has passed, the method ends and the best perturbation is provided as adversarial perturbation.

Figure 2:
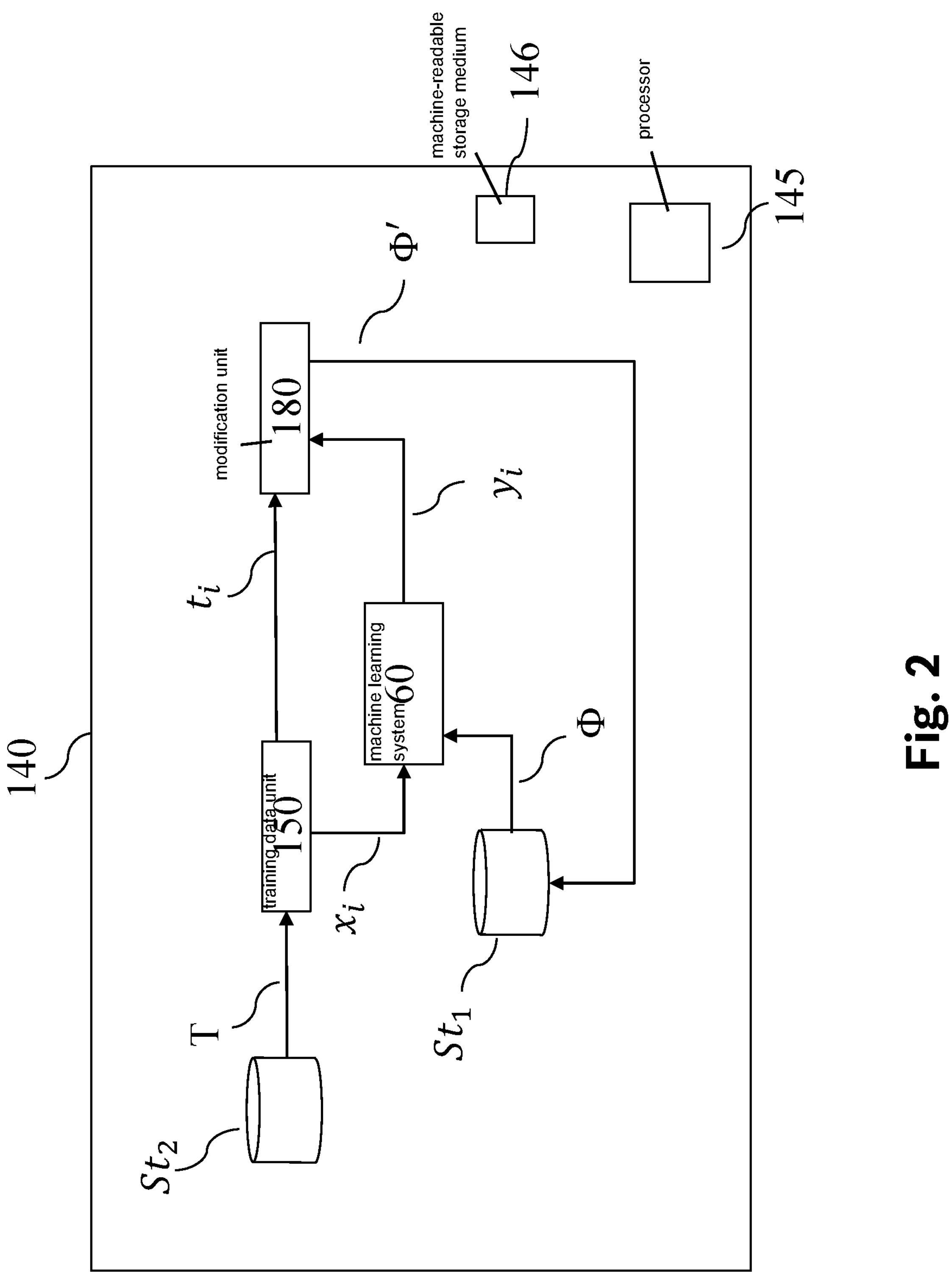
FIG. 2 shows a training system for training a machine learning system, according to an example embodiment of the present invention.

FIG. 2 shows an embodiment of a training system (140) for training the machine learning system (60) of the control system (40) by means of a training data set (T) in order to harden the machine learning system (60) against adversarial perturbations. The training data set (T) comprises a plurality of input signals which are used for training the machine learning system (60), wherein the training data set (T) further comprises, for each input signal, a desired output signal ($t_i$) which corresponds to the input signal and characterizes a classification and/or regression result of the input signal.

For training, a training data unit (150) accesses a computer-implemented database ($St_2$), the database ($St_2$) providing the training data set (T). The training data unit (150) determines from the training data set (T) preferably randomly at least one input signal and the desired output signal ($t_i$) corresponding to the input signal. The training data unit (150) then determines an adversarial perturbation for the machine learning system (60) using, e.g., the method of FIG. 1, and applies the adversarial perturbation to the input signal, thereby determining an adversarial example ($x_i$). The adversarial example ($x_i$) is then transmitted to the machine learning system (60). The machine learning system (60) determines an output signal ($y_i$) based on the input signal ($x_i$).

The desired output signal ($t_i$) and the determined output signal ($y_i$) are transmitted to a modification unit (180).

Based on the desired output signal ($t_i$) and the determined output signal ($y_i$), the modification unit (180) then determines new parameters ($\Phi'$) for the machine learning system (60). For this purpose, the modification unit (180) compares the desired output signal ($t_i$) and the determined output signal ($y_i$) using a loss function. The loss function determines a first loss value that characterizes how far the determined output signal ($y_i$) deviates from the desired output signal ($t_i$). In the given embodiment, a negative log-likehood function is used as the loss function. Other loss functions are also conceivable in alternative embodiments.

Furthermore, it is conceivable that the determined output signal ($y_i$) and the desired output signal ($t_i$) each comprise a plurality of sub-signals, for example in the form of tensors, wherein a sub-signal of the desired output signal ($t_i$) corresponds to a sub-signal of the determined output signal ($y_i$). It is conceivable, for example, that the machine learning system (60) is configured for object detection and a first sub-signal characterizes a probability of occurrence of an object with respect to a part of the input signal ($x_i$) and a second sub-signal characterizes the exact position of the object. If the determined output signal ($y_i$) and the desired output signal ($t_i$) comprise a plurality of corresponding sub-signals, a second loss value is preferably determined for each corresponding sub-signal by means of a suitable loss function and the determined second loss values are suitably combined to form the first loss value, for example by means of a weighted sum.

The modification unit (180) determines the new parameters ($\Phi'$) based on the first loss value. In the given embodiment, this is done using a gradient descent method, preferably stochastic gradient descent, Adam, or AdamW. In further embodiments, training may also be based on an evolutionary algorithm or a second-order method for training neural networks.

In other preferred embodiments, the described training is repeated iteratively for a predefined number of iteration steps or repeated iteratively until the first loss value falls below a predefined threshold value. Alternatively or additionally, it is also conceivable that the training is terminated when an average first loss value with respect to a test or validation data set falls below a predefined threshold value. In at least one of the iterations the new parameters ($\Phi'$) determined in a previous iteration are used as parameters ($\Phi$) of the machine learning system (60).

Furthermore, the training system (140) may comprise at least one processor (145) and at least one machine-readable storage medium (146) containing instructions which, when executed by the processor (145), cause the training system (140) to execute a training method according to one of the aspects of the invention.

Figure 3:
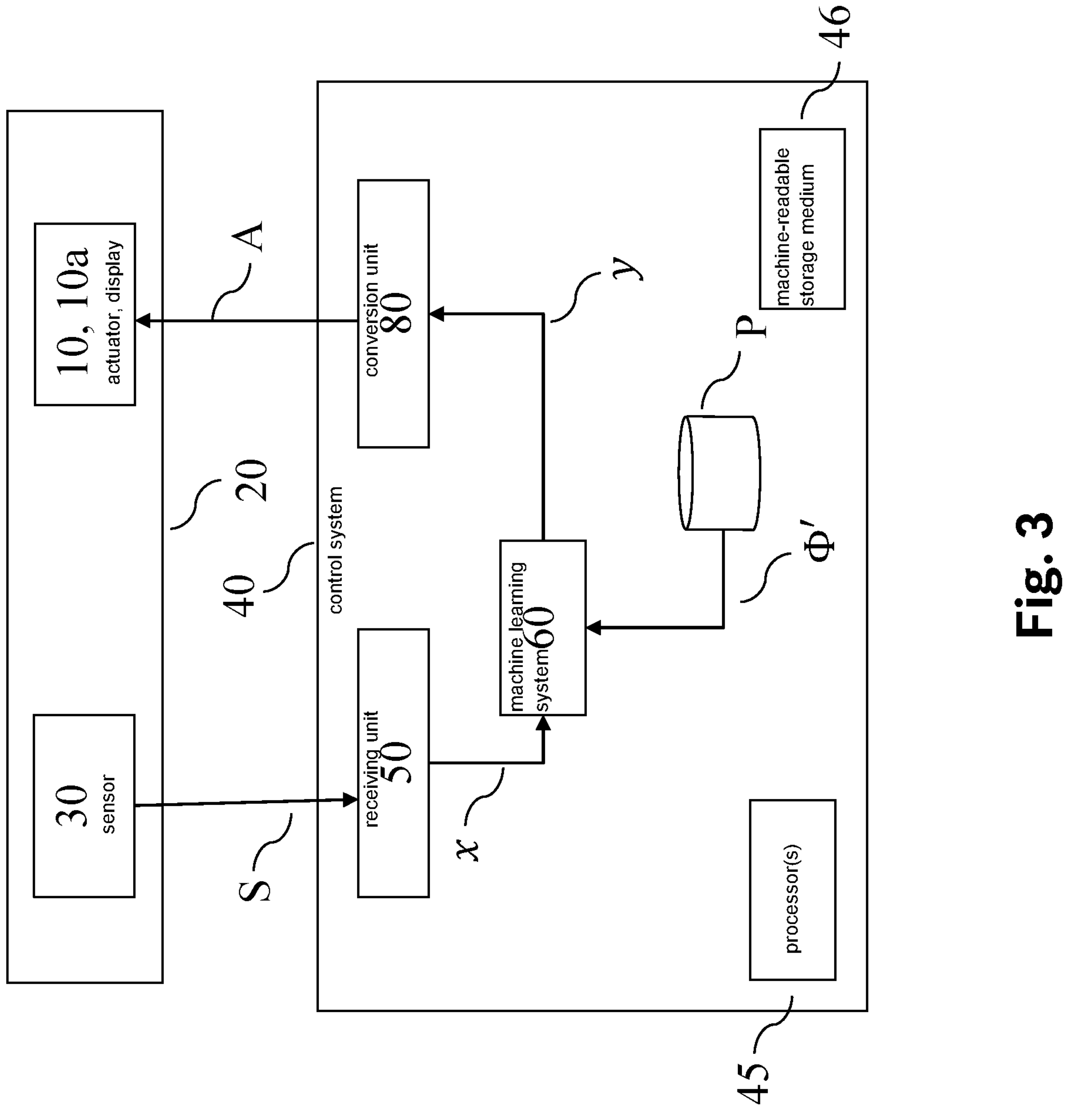
FIG. 3 shows a control system comprising the machine learning system controlling an actuator in its environment, according to an example embodiment of the present invention.

FIG. 3 shows an embodiment of an actuator (10) in its environment (20). The actuator (10) interacts with a control system (40). The actuator (10) and its environment (20) will be jointly called actuator system. At preferably evenly spaced points in time, a sensor (30) senses a condition of the actuator system. The sensor (30) may comprise several sensors. Preferably, the sensor (30) is an optical sensor that takes images of the environment (20). An output signal (S) of the sensor (30) (or, in case the sensor (30) comprises a plurality of sensors, an output signal (S) for each of the sensors) which encodes the sensed condition is transmitted to the control system (40).

Thereby, the control system (40) receives a stream of sensor signals (S). It then computes a series of control signals (A) depending on the stream of sensor signals (S), which are then transmitted to the actuator (10).

The control system (40) receives the stream of sensor signals (S) of the sensor (30) in an optional receiving unit (50). The receiving unit (50) transforms the sensor signals (S) into input signals (x). Alternatively, in case of no receiving unit (50), each sensor signal (S) may directly be taken as an input signal (x). The input signal (x) may, for example, be given as an excerpt from the sensor signal (S). Alternatively, the sensor signal (S) may be processed to yield the input signal (x). In other words, the input signal (x) is provided in accordance with the sensor signal (S).

The input signal (x) is then passed on to the machine learning system (60).

The machine learning system (60) is parametrized by parameters ($\Phi$), which are stored in and provided by a parameter storage ($St_1$).

The machine learning system (60) determines an output signal (y) from the input signals (x). The output signal (y) comprises information that assigns one or more labels to the input signal (x). The output signal (y) is transmitted to an optional conversion unit (80), which converts the output signal (y) into the control signals (A). The control signals (A) are then transmitted to the actuator (10) for controlling the actuator (10) accordingly. Alternatively, the output signal (y) may directly be taken as control signal (A).

The actuator (10) receives control signals (A), is controlled accordingly and carries out an action corresponding to the control signal (A). The actuator (10) may comprise a control logic which transforms the control signal (A) into a further control signal, which is then used to control actuator (10).

In further embodiments, the control system (40) may comprise the sensor (30). In even further embodiments, the control system (40) alternatively or additionally may comprise an actuator (10).

In still further embodiments, it can be envisioned that the control system (40) controls a display (10*a*) instead of or in addition to the actuator (10).

Furthermore, the control system (40) may comprise at least one processor (45) and at least one machine-readable storage medium (46) on which instructions are stored which, if carried out, cause the control system (40) to carry out a method according to an aspect of the invention.

Figure 4:
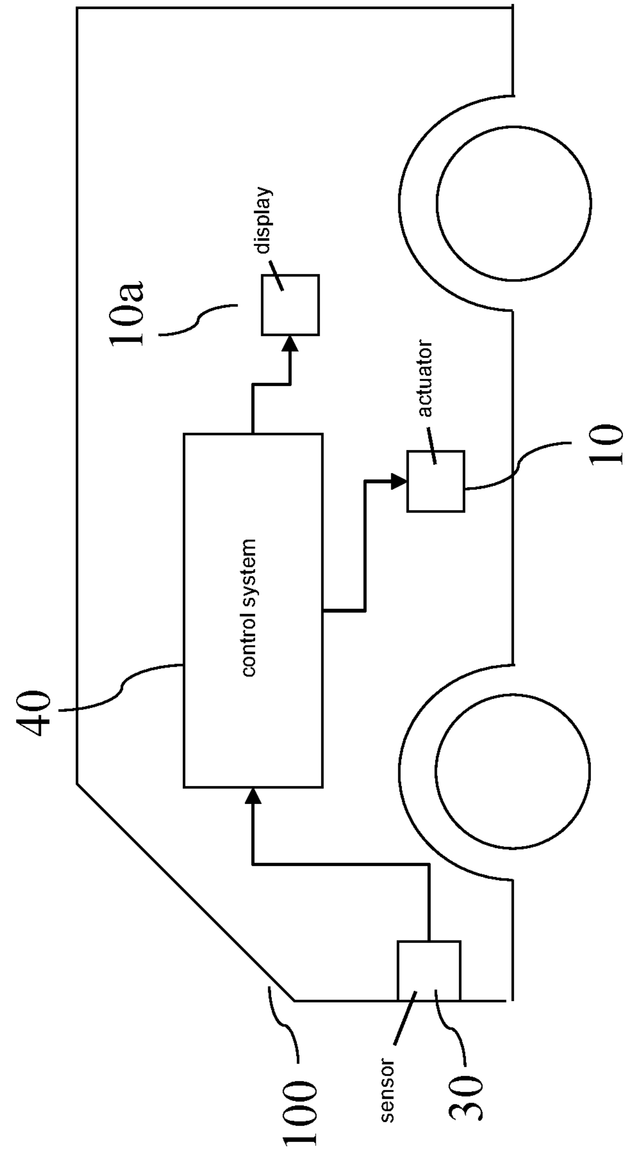
FIG. 4 shows the control system controlling an at least partially autonomous robot, according to an example embodiment of the present invention.

FIG. 4 shows an embodiment in which the control system (40) is used to control an at least partially autonomous robot, e.g., an at least partially autonomous vehicle (100).

The sensor (30) may comprise one or more video sensors and/or one or more radar sensors and/or one or more ultrasonic sensors and/or one or more LiDAR sensors. Some or all of these sensors are preferably but not necessarily integrated in the vehicle (100). The input signal (x) may hence be understood as an input image and the machine learning system (60) as an image classifier.

The machine learning system (60) may be configured to detect objects in the vicinity of the at least partially autonomous robot based on the input image (x). The output signal (y) may comprise an information, which characterizes where objects are located in the vicinity of the at least partially autonomous robot. The control signal (A) may then be determined in accordance with this information, for example to avoid collisions with the detected objects.

The actuator (10), which is preferably integrated in the vehicle (100), may be given by a brake, a propulsion system, an engine, a drivetrain, or a steering of the vehicle (100). The control signal (A) may be determined such that the actuator (10) is controlled such that vehicle (100) avoids collisions with the detected objects. The detected objects may also be classified according to what the machine learning system (60) deems them most likely to be, e.g., pedestrians or trees, and the control signal (A) may be determined depending on the classification.

Alternatively or additionally, the control signal (A) may also be used to control the display (10*a*), e.g., for displaying the objects detected by the machine learning system (60). It can also be imagined that the control signal (A) may control the display (10*a*) such that it produces a warning signal if the vehicle (100) is close to colliding with at least one of the detected objects. The warning signal may be a warning sound and/or a haptic signal, e.g., a vibration of a steering wheel of the vehicle.

In further embodiments, the at least partially autonomous robot may be given by another mobile robot (not shown), which may, for example, move by flying, swimming, diving or stepping. The mobile robot may, inter alia, be an at least partially autonomous lawn mower, or an at least partially autonomous cleaning robot. In all of the above embodiments, the control signal (A) may be determined such that propulsion unit and/or steering and/or brake of the mobile robot are controlled such that the mobile robot may avoid collisions with said identified objects.

In a further embodiment, the at least partially autonomous robot may be given by a gardening robot (not shown), which uses the sensor (30), preferably an optical sensor, to determine a state of plants in the environment (20). The actuator (10) may control a nozzle for spraying liquids and/or a cutting device, e.g., a blade. Depending on an identified species and/or an identified state of the plants, an control signal (A) may be determined to cause the actuator (10) to spray the plants with a suitable quantity of suitable liquids and/or cut the plants.

In even further embodiments, the at least partially autonomous robot may be given by a domestic appliance (not shown), like e.g. a washing machine, a stove, an oven, a microwave, or a dishwasher. The sensor (30), e.g., an optical sensor, may detect a state of an object which is to undergo processing by the household appliance. For example, in the case of the domestic appliance being a washing machine, the sensor (30) may detect a state of the laundry inside the washing machine. The control signal (A) may then be determined depending on a detected material of the laundry.

Figure 5:
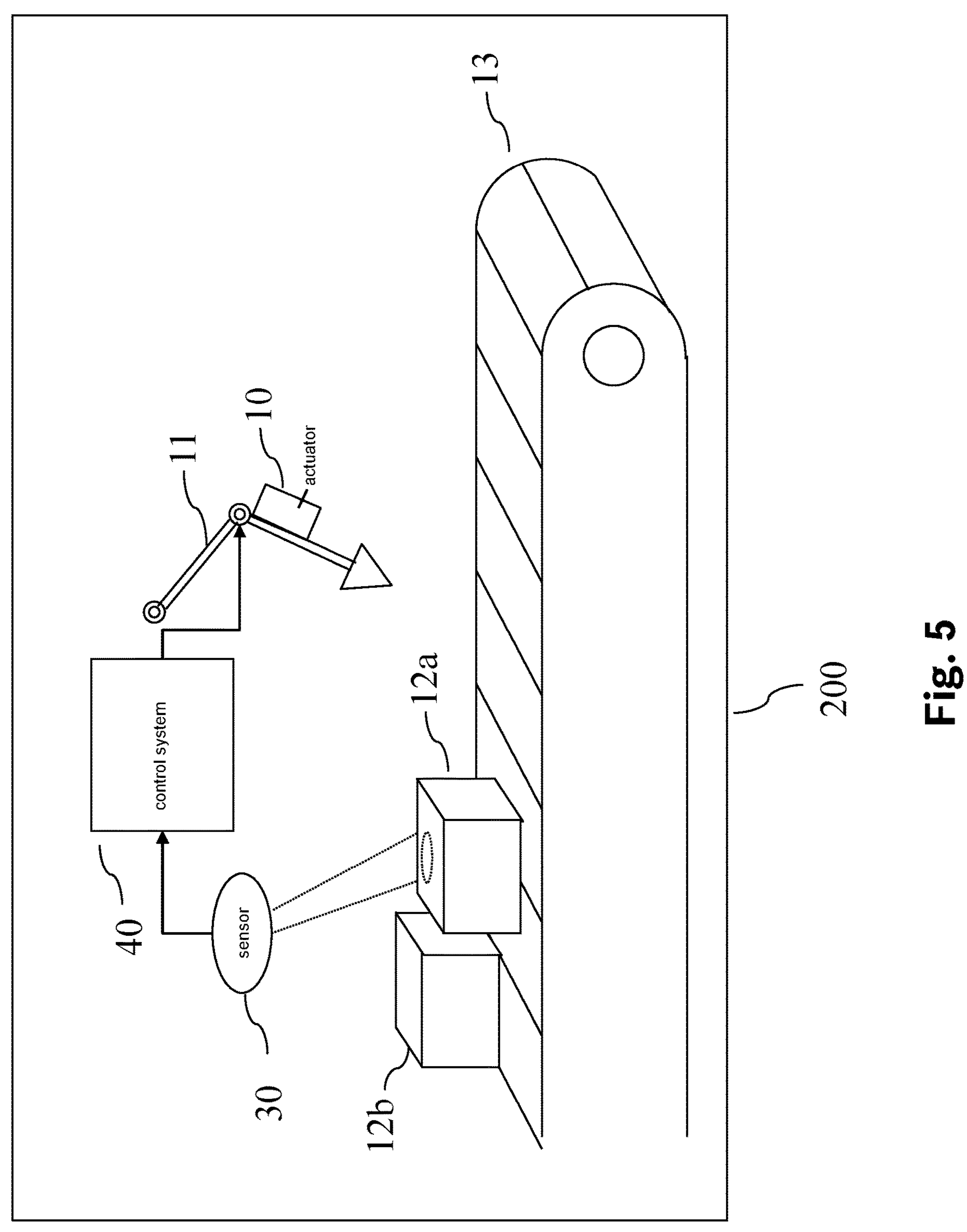
FIG. 5 shows the control system controlling a manufacturing machine, according to an example embodiment of the present invention.

FIG. 5 shows an embodiment in which the control system (40) is used to control a manufacturing machine (11), e.g., a punch cutter, a cutter, a gun drill or a gripper, of a manufacturing system (200), e.g., as part of a production line. The manufacturing machine may comprise a transportation device, e.g., a conveyer belt or an assembly line, which moves a manufactured product (12). The control system (40) controls an actuator (10), which in turn controls the manufacturing machine (11).

The sensor (30) may be given by an optical sensor which captures properties of, e.g., a manufactured product (12). The machine learning system (60) may hence be understood as an image classifier.

The machine learning system (60) may determine a position of the manufactured product (12) with respect to the transportation device. The actuator (10) may then be controlled depending on the determined position of the manufactured product (12) for a subsequent manufacturing step of the manufactured product (12). For example, the actuator (10) may be controlled to cut the manufactured product at a specific location of the manufactured product itself. Alternatively, it may be envisioned that the machine learning system (60) classifies, whether the manufactured product is broken or exhibits a defect. The actuator (10) may then be controlled as to remove the manufactured product from the transportation device.

Figure 6:
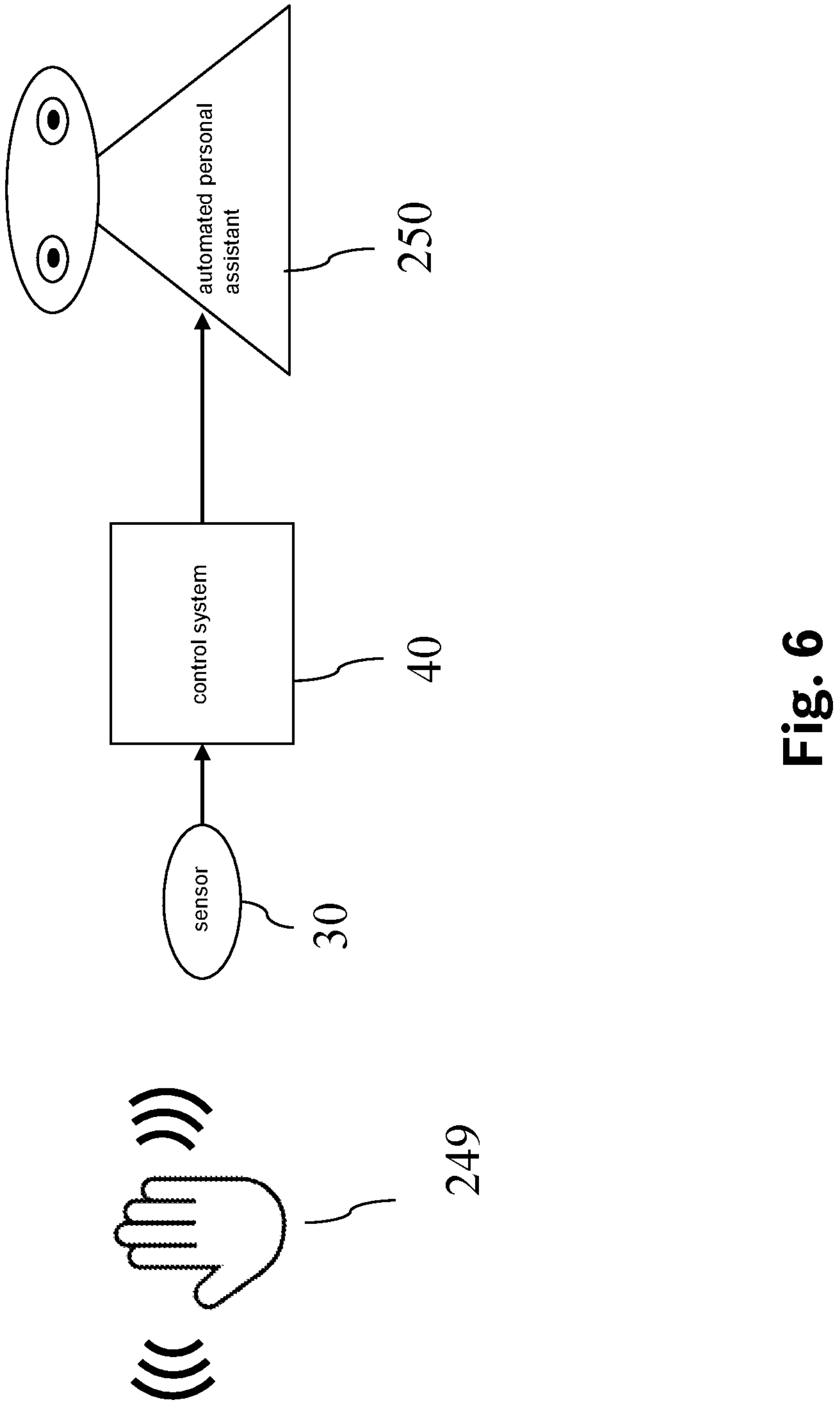
FIG. 6 shows the control system controlling an automated personal assistant, according to an example embodiment of the present invention.

FIG. 6 shows an embodiment in which the control system (40) is used for controlling an automated personal assistant (250). The sensor (30) may be an optic sensor, e.g., for receiving video images of a gestures of a user (249). Alternatively, the sensor (30) may also be an audio sensor, e.g., for receiving a voice command of the user (249).

The control system (40) then determines control signals (A) for controlling the automated personal assistant (250). The control signals (A) are determined in accordance with the sensor signal (S) of the sensor (30). The sensor signal (S) is transmitted to the control system (40). For example, the machine learning system (60) may be configured to, e.g., carry out a gesture recognition algorithm to identify a gesture made by the user (249). The control system (40) may then determine a control signal (A) for transmission to the automated personal assistant (250). It then transmits the control signal (A) to the automated personal assistant (250).

For example, the control signal (A) may be determined in accordance with the identified user gesture recognized by the machine learning system (60). It may comprise information that causes the automated personal assistant (250) to retrieve information from a database and output this retrieved information in a form suitable for reception by the user (249).

In further embodiments, it may be envisioned that instead of the automated personal assistant (250), the control system (40) controls a domestic appliance (not shown) controlled in accordance with the identified user gesture. The domestic appliance may be a washing machine, a stove, an oven, a microwave or a dishwasher.

Figure 7:
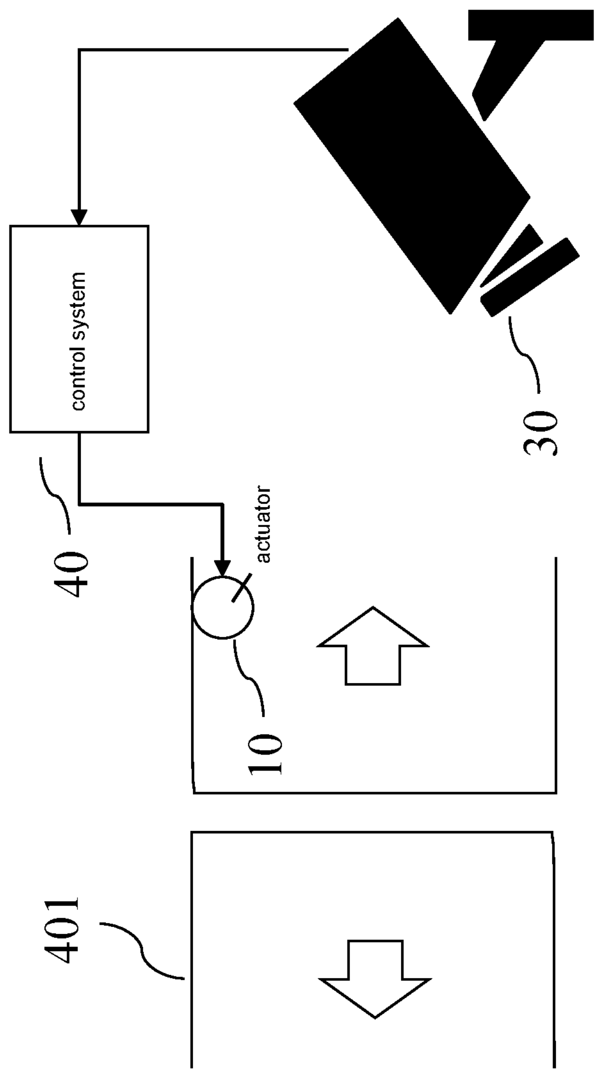
FIG. 7 shows the control system controlling an access control system, according to an example embodiment of the present invention.
Figure 7:

FIG. 7 shows an embodiment in which the control system (40) controls an access control system (300). The access control system (300) may be designed to physically control access. It may, for example, comprise a door (401). The sensor (30) can be configured to detect a scene that is relevant for deciding whether access is to be granted or not. It may, for example, be an optical sensor for providing image or video data, e.g., for detecting a person's face. The machine learning system (60) may hence be understood as an image classifier.

The machine learning system (60) may be configured to classify an identity of the person, e.g., by matching the detected face of the person with other faces of known persons stored in a database, thereby determining an identity of the person. The control signal (A) may then be determined depending on the classification of the machine learning system (60), e.g., in accordance with the determined identity.

The actuator (10) may be a lock which opens or closes the door depending on the control signal (A). Alternatively, the access control system (300) may be a non-physical, logical access control system. In this case, the control signal may be used to control the display (10*a*) to show information about the person's identity and/or whether the person is to be given access.

Figure 8:
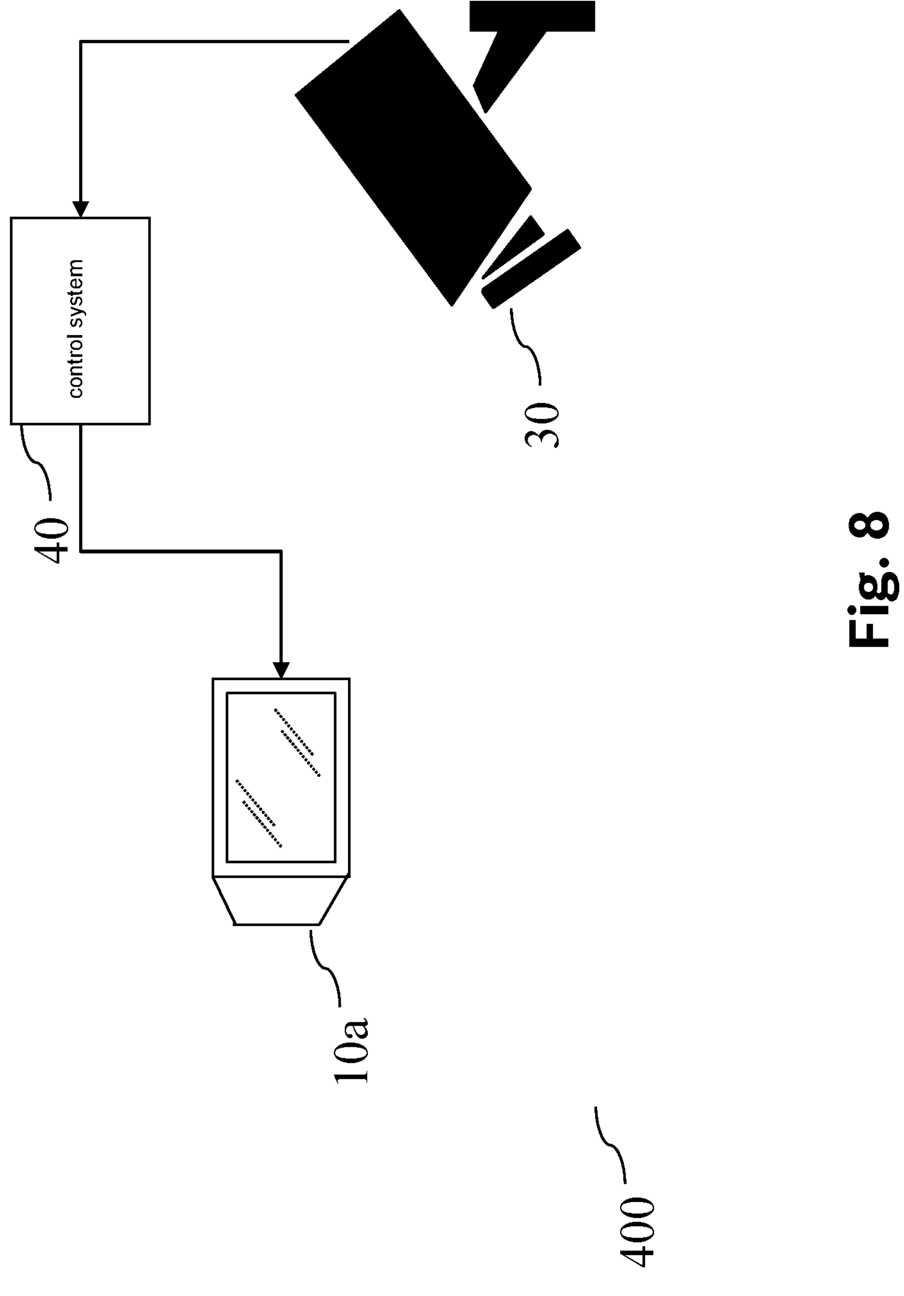
FIG. 8 shows the control system controlling a surveillance system, according to an example embodiment of the present invention.

FIG. 8 shows an embodiment in which the control system (40) controls a surveillance system (400). This embodiment is largely identical to the embodiment shown in FIG. 7. Therefore, only the differing aspects will be described in detail. The sensor (30) is configured to detect a scene that is under surveillance. The control system (40) does not necessarily control an actuator (10), but may alternatively control a display (10*a*). For example, the machine learning system (60) may determine a classification of a scene, e.g., whether the scene detected by an optical sensor (30) is normal or whether the scene exhibits an anomaly. The control signal (A), which is transmitted to the display (10*a*), may then, for example, be configured to cause the display (10*a*) to adjust the displayed content dependent on the determined classification, e.g., to highlight an object that is deemed anomalous by the machine learning system (60).

Figure 9:
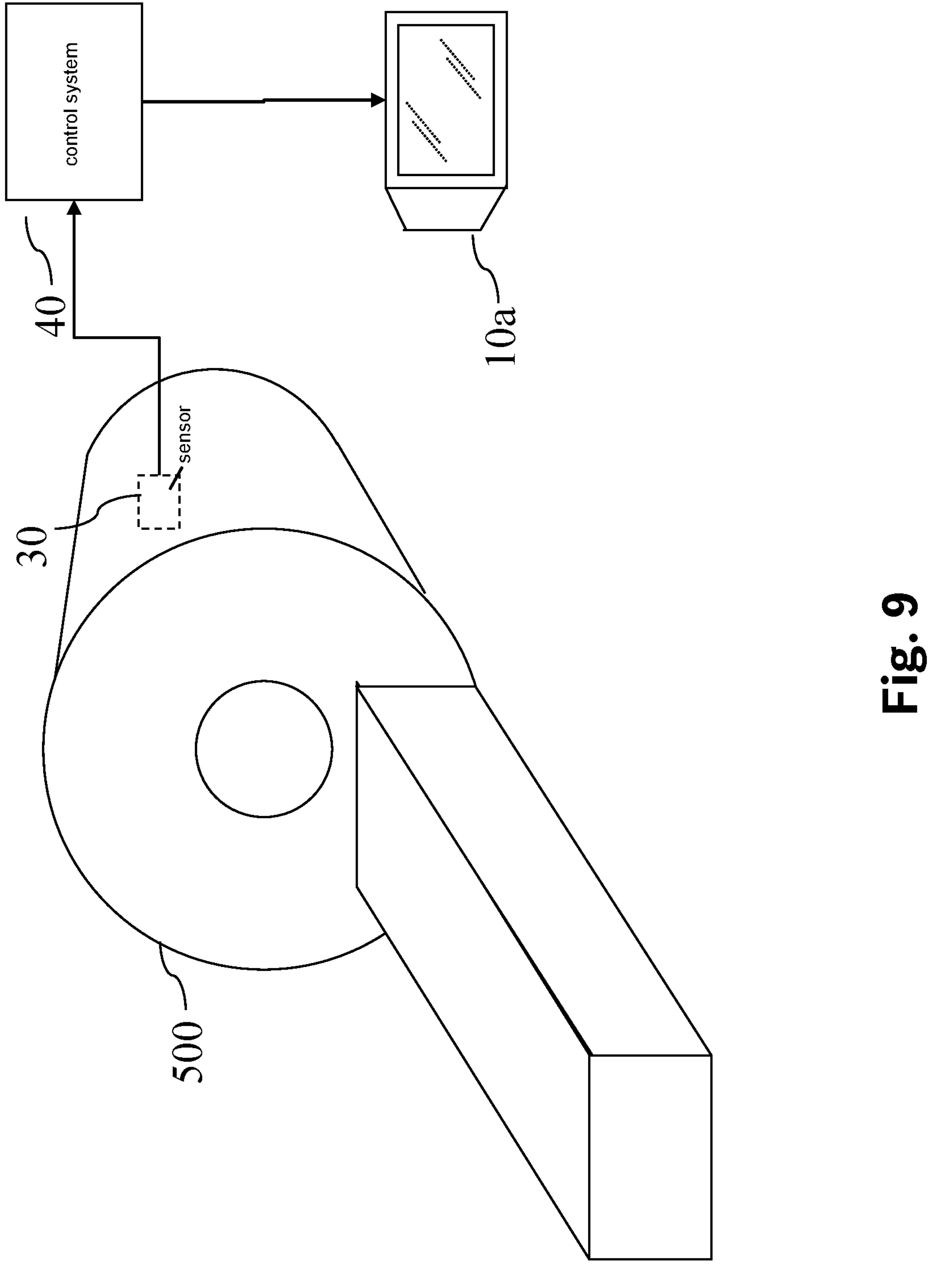
FIG. 9 shows the control system controlling an imaging system, according to an example embodiment of the present invention.

FIG. 9 shows an embodiment of a medical imaging system (500) controlled by the control system (40). The imaging system may, for example, be an MRI apparatus, x-ray imaging apparatus or ultrasonic imaging apparatus. The sensor (30) may, for example, be an imaging sensor which takes at least one image of a patient, e.g., displaying different types of body tissue of the patient.

The machine learning system (60) may then determine a classification of at least a part of the sensed image. The at least part of the image is hence used as input image (x) to the machine learning system (60). The machine learning system (60) may hence be understood as an image classifier.

The control signal (A) may then be chosen in accordance with the classification, thereby controlling a display (10*a*). For example, the machine learning system (60) may be configured to detect different types of tissue in the sensed image, e.g., by classifying the tissue displayed in the image into either malignant or benign tissue. This may be done by means of a semantic segmentation of the input image (x) by the machine learning system (60). The control signal (A) may then be determined to cause the display (10*a*) to display different tissues, e.g., by displaying the input image (x) and coloring different regions of identical tissue types in a same color.

In further embodiments (not shown) the imaging system (500) may be used for non-medical purposes, e.g., to determine material properties of a workpiece. In these embodiments, the machine learning system (60) may be configured to receive an input image (x) of at least a part of the workpiece and perform a semantic segmentation of the input image (x), thereby classifying the material properties of the workpiece. The control signal (A) may then be determined to cause the display (10*a*) to display the input image (x) as well as information about the detected material properties.

Figure 10:
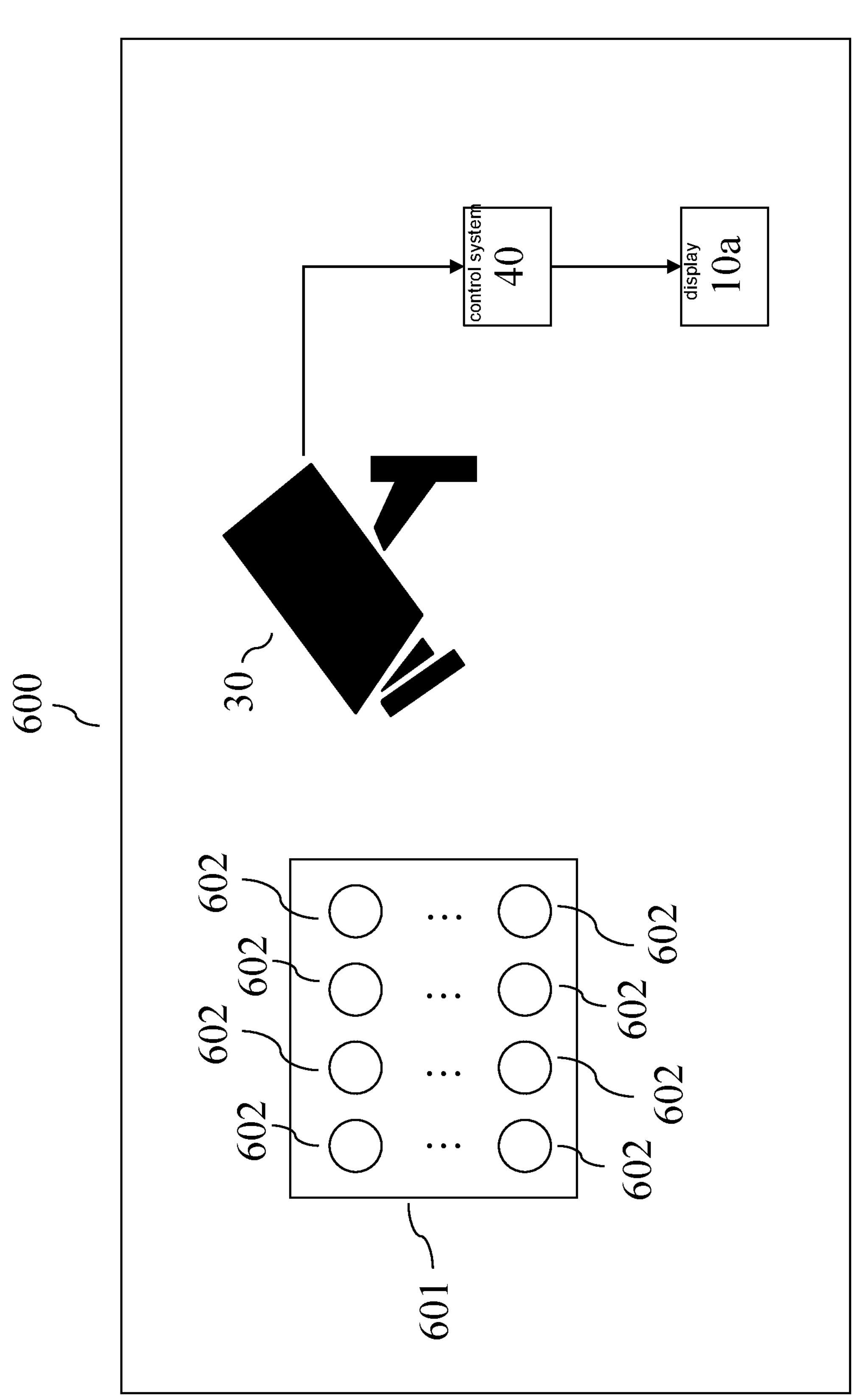
FIG. 10 shows the control system controlling a medical analysis system, according to an example embodiment of the present invention.

FIG. 10 shows an embodiment of a medical analysis system (600) being controlled by the control system (40). The medical analysis system (600) is supplied with a microarray (601), wherein the microarray comprises a plurality of spots (602, also known as features) which have been exposed to a medical specimen. The medical specimen may, for example, be a human specimen or an animal specimen, e.g., obtained from a swab.

The microarray (601) may be a DNA microarray or a protein microarray.

The sensor (30) is configured to sense the microarray (601). The sensor (30) is preferably an optical sensor such as a video sensor. The machine learning system (60) may hence be understood as an image classifier.

The machine learning system (60) is configured to classify a result of the specimen based on an input image (x) of the microarray supplied by the sensor (30). In particular, the machine learning system (60) may be configured to determine whether the microarray (601) indicates the presence of a virus in the specimen.

The control signal (A) may then be chosen such that the display (10*a*) shows the result of the classification.

The term "computer" may be understood as covering any devices for the processing of pre-defined calculation rules. These calculation rules can be in the form of software, hardware or a mixture of software and hardware.

In general, a plurality can be understood to be indexed, that is, each element of the plurality is assigned a unique index, preferably by assigning consecutive integers to the elements contained in the plurality. Preferably, if a plurality comprises N elements, wherein N is the number of elements in the plurality, the elements are assigned the integers from 1 to N. It may also be understood that elements of the plurality can be accessed by their index.

What is claimed is:

1. A computer-implemented method for determining an adversarial perturbation for input signals of a machine learning system, the method comprising the following steps:

iteratively determining a best perturbation, wherein the best perturbation is provided as adversarial perturbation after a predefined amount of iterations, wherein at least one iteration includes the following steps:
  - sampling a perturbation;
  - applying the sampled perturbation to an input signal to determine a potential adversarial example;
  - determining an output signal from the machine learning system for the potential adversarial example;
  - determining a loss value characterizing a deviation of the output signal to a desired output signal, wherein the desired output signal corresponds to the input signal;
  - based on the loss value being larger than a previous loss value, setting the best perturbation to the sampled perturbation;
  - wherein in each iteration, elements of the sampled perturbation are set to zero, wherein a number of elements set to zero is proportional to how many iterations have passed.

2. The method according to claim 1, wherein the input signals are sensor signals or features of sensor signals.

3. The method according to claim 1, wherein at least one element of the input signal characterizes an integer and the sampled perturbation includes a corresponding element characterizing an integer.

4. The method according to claim 1, wherein the adversarial perturbation is sampled by sampling a random perturbation for each input signal of a dataset and combining the sampled random perturbations.

5. The method according to claim 1, wherein the output signal characterizes a classification and/or regression result and/or a density value and/or a probability value, based on the input signal.

6. The method according to claim 1, further comprising:

applying the adversarial perturbation to a training input signal to determine an adversarial example for training the machine learning system.

7. A method for training a machine learning system, the method comprising the following steps:
training the machine learning system including:
determining for a training input signal of the machine learning system an adversarial perturbation by:
iteratively determining a best perturbation, wherein the best perturbation is provided as adversarial perturbation after a predefined amount of iterations, wherein at least one iteration includes the following steps:
sampling a perturbation,
applying the sampled perturbation to an input signal to determine a potential adversarial example,
determining an output signal from the machine learning system for the potential adversarial example,
determining a loss value characterizing a deviation of the output signal to a desired output signal, wherein the desired output signal corresponds to the input signal,
based on the loss value being larger than a previous loss value, setting the best perturbation to the sampled perturbation,
wherein in each iteration, elements of the sampled perturbation are set to zero, wherein a number of elements set to zero is proportional to how many iterations have passed;
applying the adversarial perturbation to the training input signal to determining an adversarial example and training the machine learning system to predict a desired output signal corresponding to the training input signal for the adversarial example.

8. A training system configured to train a machine learning system, the training system configured to:
train the machine learning system including:
determining for a training input signal of the machine learning system an adversarial perturbation by:
iteratively determining a best perturbation, wherein the best perturbation is provided as adversarial perturbation after a predefined amount of iterations, wherein at least one iteration includes the following steps:
sampling a perturbation,
applying the sampled perturbation to an input signal to determine a potential adversarial example,
determining an output signal from the machine learning system for the potential adversarial example,
determining a loss value characterizing a deviation of the output signal to a desired output signal, wherein the desired output signal corresponds to the input signal,
based on the loss value being larger than a previous loss value, setting the best perturbation to the sampled perturbation,
wherein in each iteration, elements of the sampled perturbation are set to zero, wherein a number of elements set to zero is proportional to how many iterations have passed;
apply the adversarial perturbation to the training input signal to determining an adversarial example and training the machine learning system to predict a desired output signal corresponding to the training input signal for the adversarial example.

9. A non-transitory machine-readable storage medium on which is stored a computer program for determining an adversarial perturbation for input signals of a machine learning system, the computer program, when executed by a computer, causing the computer to perform the following steps comprising:
iteratively determining a best perturbation, wherein the best perturbation is provided as adversarial perturbation after a predefined amount of iterations, wherein at least one iteration includes the following steps:
sampling a perturbation;
applying the sampled perturbation to an input signal to determine a potential adversarial example;
determining an output signal from the machine learning system for the potential adversarial example;
determining a loss value characterizing a deviation of the output signal to a desired output signal, wherein the desired output signal corresponds to the input signal;
based on the loss value being larger than a previous loss value, setting the best perturbation to the sampled perturbation,
wherein in each iteration, elements of the sampled perturbation are set to zero, wherein a number of elements set to zero is proportional to how many iterations have passed.

10. The non-transitory machine-readable storage medium according to claim 9, wherein the computer program, when executed by a computer, further causing the computer to perform the following step comprising:
applying the adversarial perturbation to a training input signal to determine an adversarial example for training the machine learning system.

* * * * *